US 6,559,976 B1

(12) United States Patent
Hirota

(10) Patent No.: US 6,559,976 B1
(45) Date of Patent: May 6, 2003

(54) COLOR IMAGE PROCESSOR

(75) Inventor: Yoshihiko Hirota, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/351,885

(22) Filed: Jul. 13, 1999

(30) Foreign Application Priority Data

Jul. 13, 1998 (JP) .......................................... 10-197084

(51) Int. Cl.[7] ........................ H04N 1/405; H04N 1/409; H04N 1/52; H04N 1/58
(52) U.S. Cl. ....................... 358/3.03; 358/3.23; 358/2.1; 358/534; 358/3.27
(58) Field of Search .............................. 358/3.03, 3.04, 358/3.05, 3.23, 3.26, 3.27, 2.1, 534, 535, 536, 1.9, 445; 382/237, 252, 254, 270

(56) References Cited

U.S. PATENT DOCUMENTS

| 5,130,819 A | * | 7/1992 | Ohta ........................ 358/445 |
| 5,570,432 A | | 10/1996 | Kojima ...................... 382/254 |
| 5,708,514 A | | 1/1998 | Higuchi et al. ............ 358/3.03 |

* cited by examiner

Primary Examiner—Scott Rogers
(74) Attorney, Agent, or Firm—Morrison & Foerster LLP

(57) ABSTRACT

In multi-level error diffusion in an image processor, a quantization error data table is accessed at an address of data from a feedback adder, to output the data at the address as quantization error data. By using the table, the error is detected at high speed with an access time for the table. The quantization error is added to an input data by an adder after error integration with weights. Thus, the feedback calculation in multi-level error diffusion is performed at high speed, while the circuit structure thereof is simplified.

12 Claims, 12 Drawing Sheets

COLOR IMAGE PROCESSOR

This application is based on application No. 10-197084/1998 filed in Japan, the content of which is incorporated hereinto by reference.

BACKGROUND OF THE INVENTION

1. Field of the Invention

The present invention relates to an image processor which converts data of input color image to data used for image forming.

2. Description of the Prior Art

A color image processor receives image data of three primary colors of red, green and blue and converts them to cyan, magenta, yellow and black data used for image forming. The cyan, magenta, yellow and black data are subjected further to other processings and finally outputted to a printer to reproduce an image.

During the image data processing, conversion such as error diffusion is used for converting the original image data of a document to image data having a smaller number of pseudo-gradation levels. In the error diffusion, an error of input image data of read density at a pixel is diffused to adjacent pixels to conserve the image density of the document. The error diffusion has an advantage that a Moire pattern does not appear due to interaction of the frequencies of the document and the dither matrix, if compared with the dither method. Therefore, it is a powerful method of pseudo-gradation processing.

However, in the conventional bi-level error diffusion, image texture inherent in the error diffusion may happen, or nonsmoothness at character edges may be observed. Therefore, it is not appropriate for a color copying machine for which high quality is required. Then, multi-level error diffusion has been suggested for gradation representation at multi-levels equal to or higher than three levels.

However, multi-level error diffusion has following problems.

For error diffusion of n-level (n>2), (n−1) threshold levels are needed for quantization and in order to detect errors on the quantization, quantization error in each quantization level has to be detected. Therefore, a circuit therefor will have a large scale.

In the error diffusion, after the error is detected, an integrated value with adjacent pixels is determined, and the error is added to the input gradation value for the next pixel. Therefore, it is needed to process in the feedback system, including the error detection, the error integration and the addition, faster than the transmission route of the input pixel data. By adopting the n-level error diffusion (n>2), the processing time in the feedback system becomes long, and it is liable to exceed a limit to be operated by the circuit.

The threshold values of quantization are generally set uniformly in the gradation dynamic range of the input image data. However, as to color image, an image texture is liable to become noticeable due to color superposition of cyan, magenta, yellow and black. Further, a gradation range wherein the image texture is noticeable is affected by the gradation characteristics which depend on change in processes in the print engine for outputting an image.

The maximum level of quantization error in the multi-level error diffusion is smaller than that of the bi-level error diffusion, and the error convergence at character edges in an image is relatively fast. Then, non-smoothness at character edges is small. However, it is not satisfactory for a quality of a character image.

SUMMARY OF THE INVENTION

An object of the present invention is to provide an image processor which performs multi-level error diffusion of high quality with a simple structure.

In one aspect of the invention, an image processor according to the invention converts an m-bit image signal representing image density level of each pixel to an n-bit image signal where m and n are natural numbers. In the image processor, a first converter quantizes the m-bit image signal of pixels located at a character boundary to the n-bit image signal, while a second converter quantizes the m-bit image signal of pixels other than the pixels located at a character boundary to the n-bit image signal. Then, a selector synthesizes outputs of the first and second converters. In the second converter, a quantizer quantizes a first m-bit image signal of an object pixel to an n-bit image signal. An error detector detects an error generated in the quantization of the first m-bit image signal, and an adder adds the detected error to a next m-bit image signal. The error detector comprises a table which receives the output signal of the adder as an address and outputs data stored at the address as the error to the adder.

An advantage of the present invention is that error detection and error integration can be processed at a higher speed in multi-level error diffusion.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
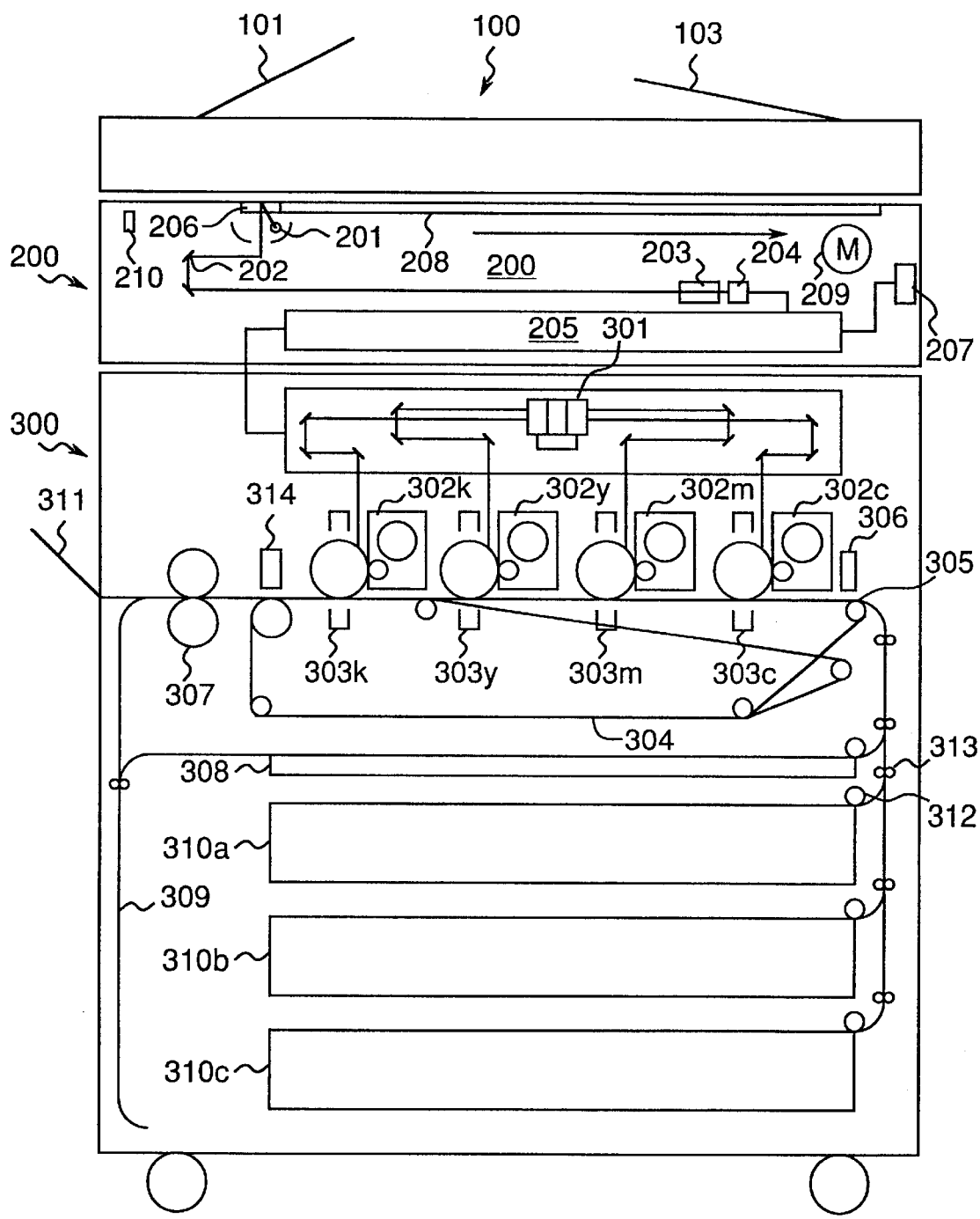
FIG. 1 is a cross sectional view of a color digital copying machine.

Referring now to the drawings, wherein like reference characters designate like or corresponding parts throughout the several views, FIG. 1 shows a whole structure of a color digital copying machine. The copying machine comprises an automatic document feeder 100, an image reader 200 and an image forming section (printer) 300. Typically, the image reader 200 reads a document which is fed to an image read position by the automatic document feeder 100, and then the read image data is transmitted to the image forming section 300, whereby an image can be formed (copy function). Also, an interface 207 enables the copying machine to be connected to an external apparatus. Thus, the image data read by the image reader 200 is outputted to the external apparatus (image read function), or conversely the image data received from the external apparatus is sent to the image forming section 300, which forms the image (printer function).

Next, the automatic document feeder 100 is explained. It feeds a document set on a tray 101 to the image read position of the image reader 200. After the document image have been read, the document is discharged onto another tray 103. The document is fed in accordance with a command from an operation panel (not shown). The document is delivered in accordance with a read end signal from the image reader 200.

The image reader 200 is explained next. The document on a platen glass 208 is illuminated by an exposure lamp 201, and light reflected from the illuminated document is guided by three mirrors 202 to a lens 203 which forms the image on a CCD sensor 204. The CCD sensor 204 consists of three line sensors for red, green and blue arranged in parallel to each other, and the main scan direction is along the line sensors. The CCD sensor 204 converts the incident light to an electric signal. An image processing circuit 205 processes the analog electric signal and converts it to digital image data. Then, the digital image is sent to the interface 207 and the image forming section 300. A white shading correction plate 209 is located at a different position from the image read position of the platen glass plate 208. The shading correction plate 209 is read in order to create correction data for shading correction prior to the read of image information on the document.

Next, the image forming section 300 having a tandem structure is described. First, exposure and imaging is described. The image data transmitted from the image reader 200 or the interface 207 is converted to print data of cyan (C), magenta (M), yellow (Y) and black (K). The data are sent to controllers (not shown) for exposure heads. Each exposure head controller allows a laser diode to emit a light beam in accordance with the electric signal of the transmitted image data. The emitted light is scanned by a polygon mirror 301 along one dimension. Photoconductors in imaging units 302c, 302m, 302y and 302k are exposed to the light. The imaging units 302c, 302m, 302y and 302k are arranged in an array along the paper carrying direction of a belt 304 for carrying a paper. In each of the imaging units, elements required for an electrophotography process are arranged around the photoconductor. The photoconductors for C, M, Y and K is rotated clockwise, and the image forming processes are consecutively performed. A latent image formed on the photoconductor in each imaging unit is developed by each color developing unit. On the other hand, a sheet of paper is supplied from one of paper feeding cassettes 310a, 310b and 310c through a feeding path to a paper carry belt 304. A toner image on the photoconductor is transferred to the paper on a paper carrying belt 304 by a transfer chargers 303c, 303m, 303y, 303k located opposite to the photoconductor in the paper carrying belt 304. The toner images transferred onto the paper are fixed on the paper by a fixing roller pair 307. Then, the paper is discharged to a tray 311. Further, a paper reversing unit 309 reverses a paper for a double-sided copy in order to form the image on the back side of the paper.

Figure 2:
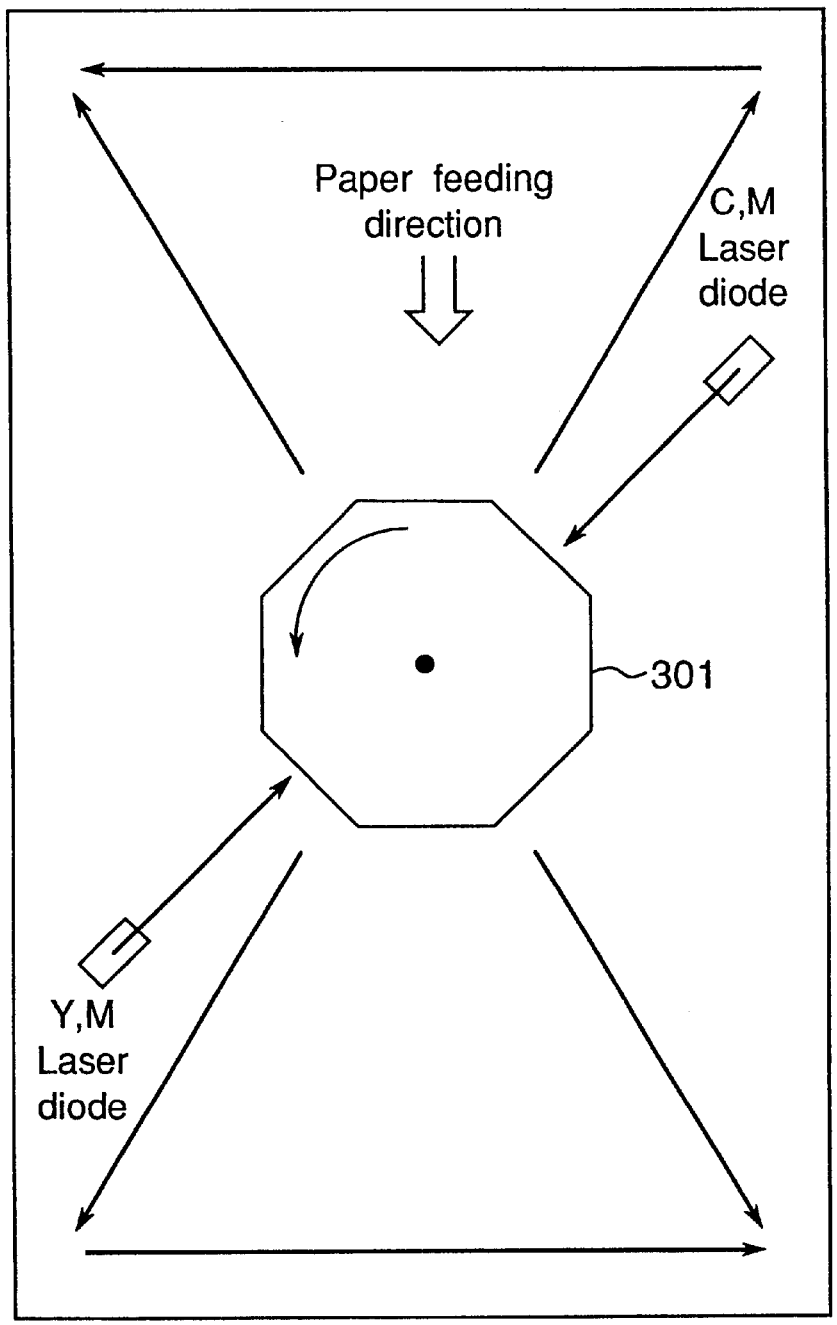
FIG. 2 is a schematic illustration of a structure of a laser optical system.

FIG. 2 shows a structure of a laser optical system (LD head) including the polygon mirror 301 viewed from above. Four beams are reflected from the polygon mirror 301. When the photoconductor for each color is exposed to the light, C and M, from the laser, the colors to be painted on the upstream side are thus exposed and scanned in the direction opposite to the direction in which the colors, Y and K, to be painted on the downstream side are exposed and scanned. As described below, the print imaging controller performs mirror image processing in the direction in which two colors on the upstream side are scanned, thereby solving this problem.

Figure 3A:
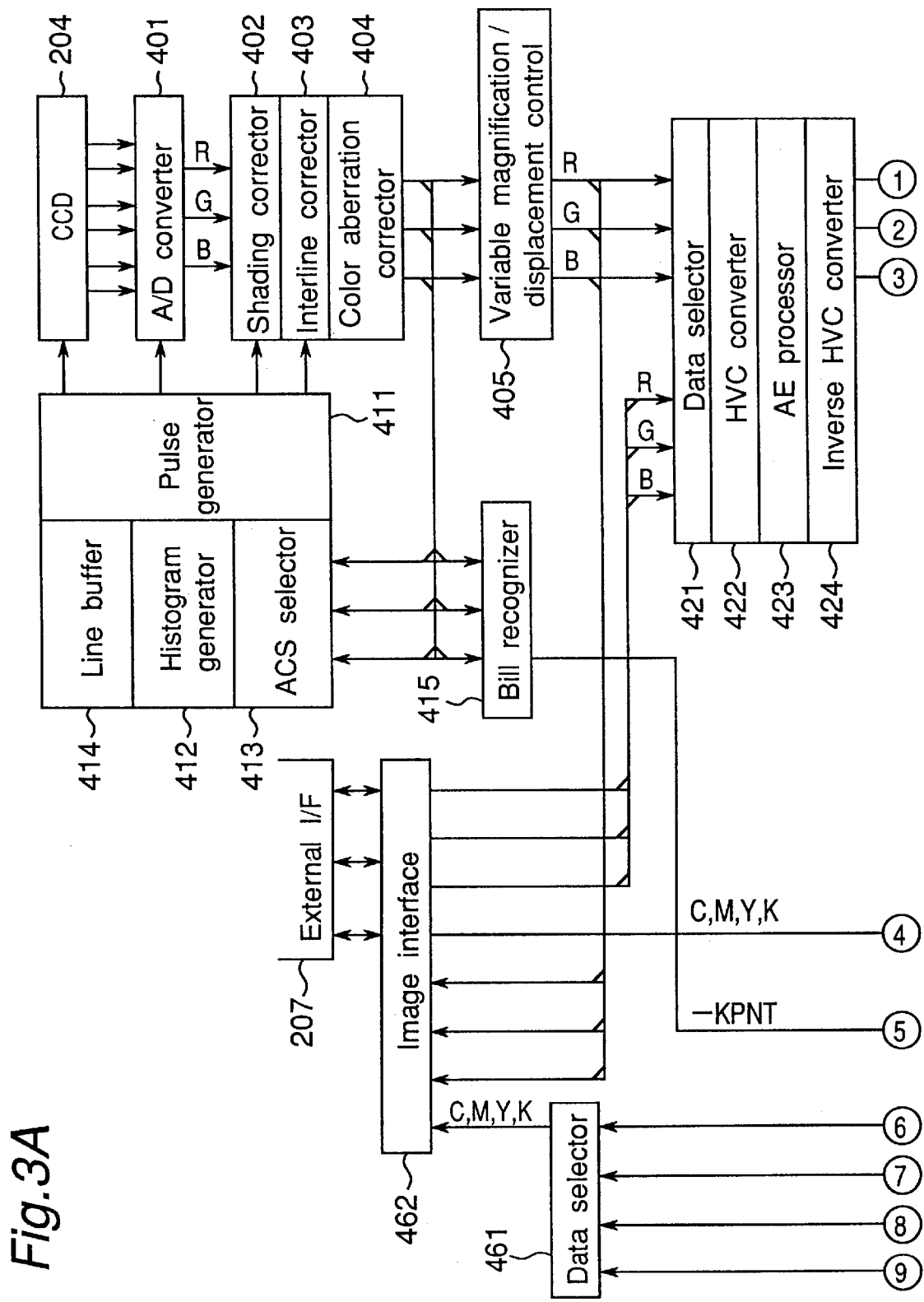
FIGS. 3A and 3B are parts of a block diagram of an image processor.
Figure 3B:
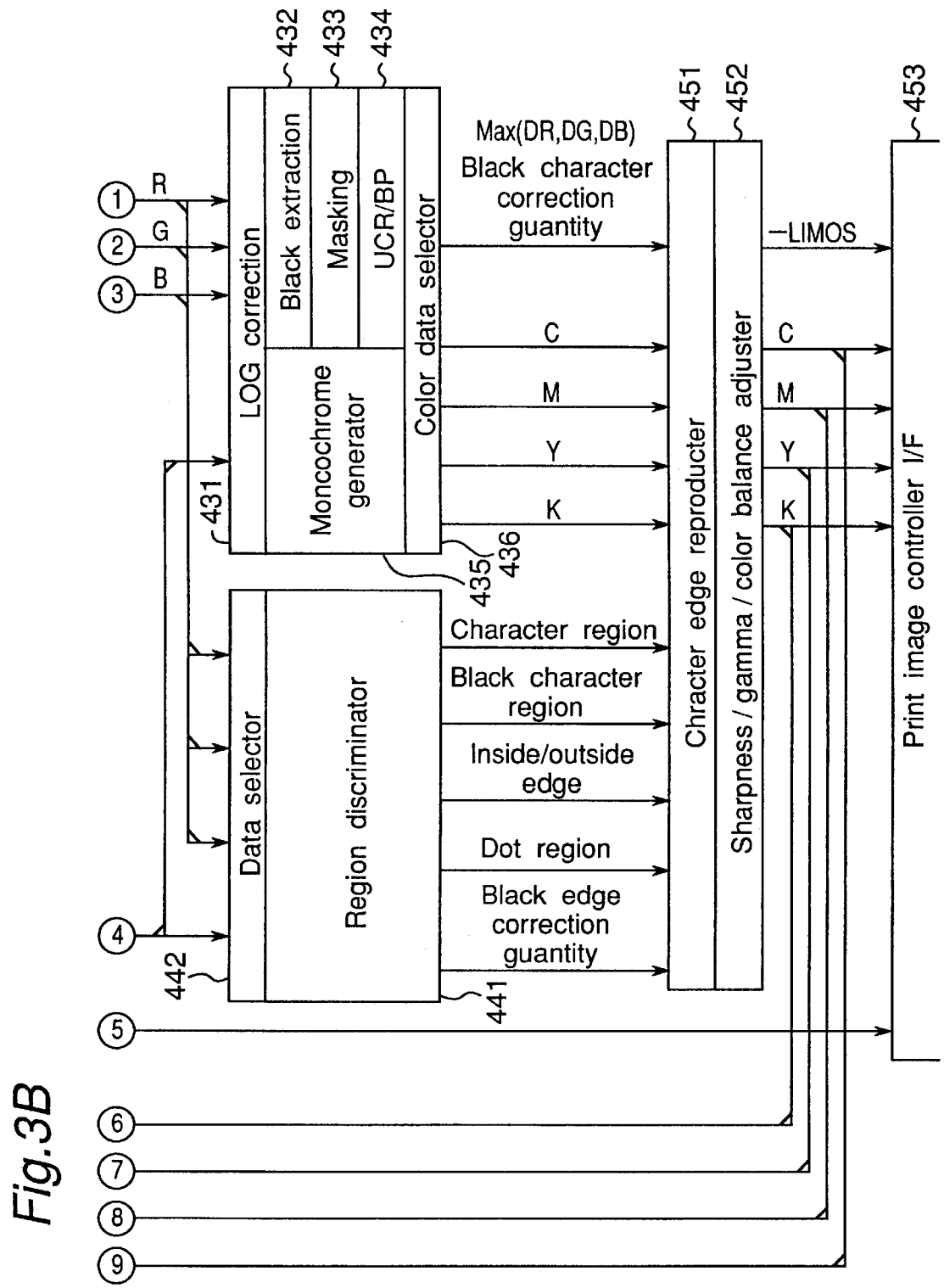

Next, a signal processing by the image reader 200 is described. FIGS. 3A and 3B show a general block diagram of the image processor 205 in the image reader 200. The light reflected from the document surface is formed by a reduction optical system onto an image on the CCD sensor 204, and an analog signal is converted by photoelectric conversion to image data of color information of R, G and B. An A/D converter 401 converts the image data of 400 dpi to 8-bit digital data (256 gradation levels) for each color information of R, G and B by the use of the A/D converter in accordance with a timing signal transmitted from a reference drive pulse generator 411. The digital data are subjected to shading correction in a shading corrector 402. Then, in an interline corrector 403, each color data is delayed line by line in accordance with a scan velocity (depending on the magnification power of subscan) in order to adjust the read positions of the sensor chip for R, G and B in the scan direction thereof. In a chroma aberration corrector 404, the phase difference among R, G and B is corrected in accordance with chroma information. In a magnification change/displacement processor 405, the magnifying power and the displacement in the main scan direction are changed. The data are thinned for reduction when they are written to a memory device, or the data is enhanced for enlargement when the data are read from the memory device.

Next, in a histogram generator 412 and an automatic color selector (ACS) 413, before copy operation of a document, based on the R, G and B data obtained by prescan, background level is controlled automatically, and it is decided automatically whether a color copy operation or a monochrome copy operation is selected. A line buffer 414 has memories which can store one line of the R, G and B data read by the image reader 200 and monitors the image data for image analysis for automatic sensitivity correction and automatic clamp of the CCD sensor for the A/D converter 401. In a bill recognizer 415, when it is decided by pattern matching that the document is a bill, a print imaging controller inhibit a normal copy by changing the K data as a black paint data.

An HVC converter 422 temporarily converts the R, G and B data received from a data selector 421 to value (V data) and color difference signals (Cr and Cb data) by a 3*3 matrix operation. Then, an automatic exposure (AE) processor 423 corrects the V data in accordance with the background level control value and corrects the Cr and Cb data in accordance with chroma level and hue level set by the operation panel. Then, an inverse HVC converter 424 converts the V, Cr and Cb data to the R, G and B data reversely by a 3*3 inverse matrix operation.

In a color corrector, after a logarithm corrector 431 converts the R, G and B data to gradation level data (DR, DG and DB data), a black extractor 432 detects a minimum color level of the DR, DG and DB data as under color component, and simultaneously a black extractor 432 detects gradation level difference between maximum and minimum colors of the R, G and B data as document chroma data. The DR, DG and DB data are subjected to a 3*6 nonlinear matrix operation in a masking operation processor 433. The DR, DG and DB data are converted to the color data (C, M, Y and K data) for color toners of the printer. An under-color removal/black paint processor (UCR/BP processor) 434 calculates UCR/ BP coefficients of the under color component (Min(R, G, B)) in accordance with the chroma data. A monochrome data generator 435 creates a value component from the R, G and B data, corrects the data with logarithm operation and outputs the data as black data (DV data). Finally, a color data selector 436 selects the image for color copy, i.e., the C, M, Y and K data or the image for monochrome copy, i.e., the DV data (C, M and Y or white).

A region discriminator 441 detects the difference (Max(R, G, B)–Min(R, G, B)) between the minimum color (Min(R, G, B)) and the maximum color from the R, G and B data inputted to the region discriminator 441 through a data selector 442. Then, a black character, a color character, a dot, and the like are discriminated. When correction on character edge is performed when a black character is discriminated, and the results are transmitted to a character edge reproducer 451. At the same time, it generates and transmits an attribute signal for switching a method of reproducing the gradation level to the print imaging controller and to a print head controller.

A character edge reproducer 451 performs the correction (edge emphasis, smoothing and character edge removal) suitable for each discriminated region from the C, M, Y and K data received from the color corrector in accordance with the result of the region discrimination. Finally, a sharpness/ gamma/color balance adjuster 452 corrects the image of the C, M, Y and K data in accordance with sharpness level, color balance level and gamma level specified with the operation panel. The adjuster 452 transmits a gradation reproduction attribute signal, –LIMOS, to a print image control interface 453. (The minus sign added before the signal means a negative logic signal.) The adjuster 452 sends the C, M, Y and K data through a data selector 461 to an image interface 462.

Finally, the image interface 462 allows the image to be inputted and outputted to/from an external apparatus. The image interface 462 is operated so that it can simultaneously receive and send the R, G and B data and it can sequentially receive and send the C, M, Y and K data. The external apparatus can use the color copying machine for the scanner function and for the printer function.

Figure 4:
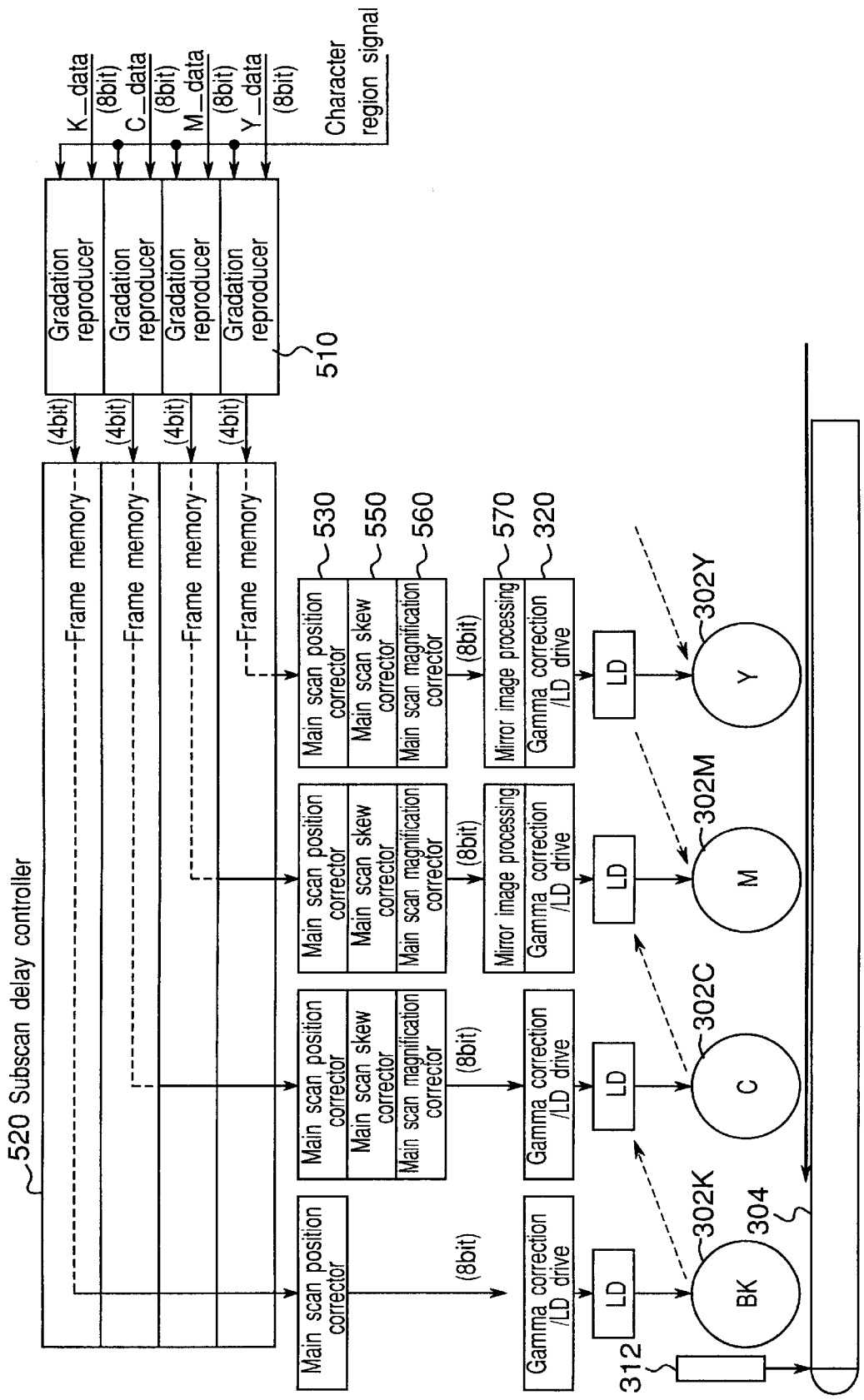
FIG. 4 is a diagram on relationship between a system structure of the copying machine and blocks in a print imaging controller.

The system explained above is a copying machine for simultaneously outputting four colors per scan, and the imaging units 302c, 302m, 302y and 302k are arranged in an array along the paper feeding direction of the paper-carrying belt 304 (FIG. 1). FIG. 4 shows relationship between the system structure and blocks in the print imaging controller. The C, M, Y and K data from the image reader 200 are simultaneously transmitted to the print imaging controller in one scan operation. Accordingly, the processing in the print imaging controller is basically parallel for the C, M and Y data. The system needs to transmit a plurality of images of C, M, Y and K toner components on a sheet of paper fed onto the paper carrying belt 304 without color shift. However, color shift happens due to various factors. Because the photoconductors are substantially equally spaced between them above the paper carrying belt 304, the timings for developing the C, M, Y and K toners are displaced by the times depending on the distances between the photoconductors. The timings for C, M, Y and K are therefore controlled by using subscan delay modules 520 so that they are delayed by the amounts depending on the distance between the photoconductors in the subscan direction. However, the colors are deviated when, for example, cyan is shifted and drawn in the subscan direction. Moreover, the latent images are formed on the photoconductors with laser scan by using one polygon mirror and four beams. Thus, raster scan directions of the first two colors (C and M) are opposite to those of the latter two colors (Y and K) and, as a result, the colors are shifted due to this mirror image relationship. In addition, for example, the print start positions are displaced in the main scan direction due to the laser scan of the colors, the magnifying power in the main scan direction is distorted, a bow distortion takes place in the subscan direction, a skew distortion takes place due to the difference in parallelism between the arrangement of the photoconductors and the laser scan. These factors also cause the color shift. These phenomena are corrected by correcting the position and the images for the C, M, Y and K data, in order to prevent the color shift.

Figure 5:
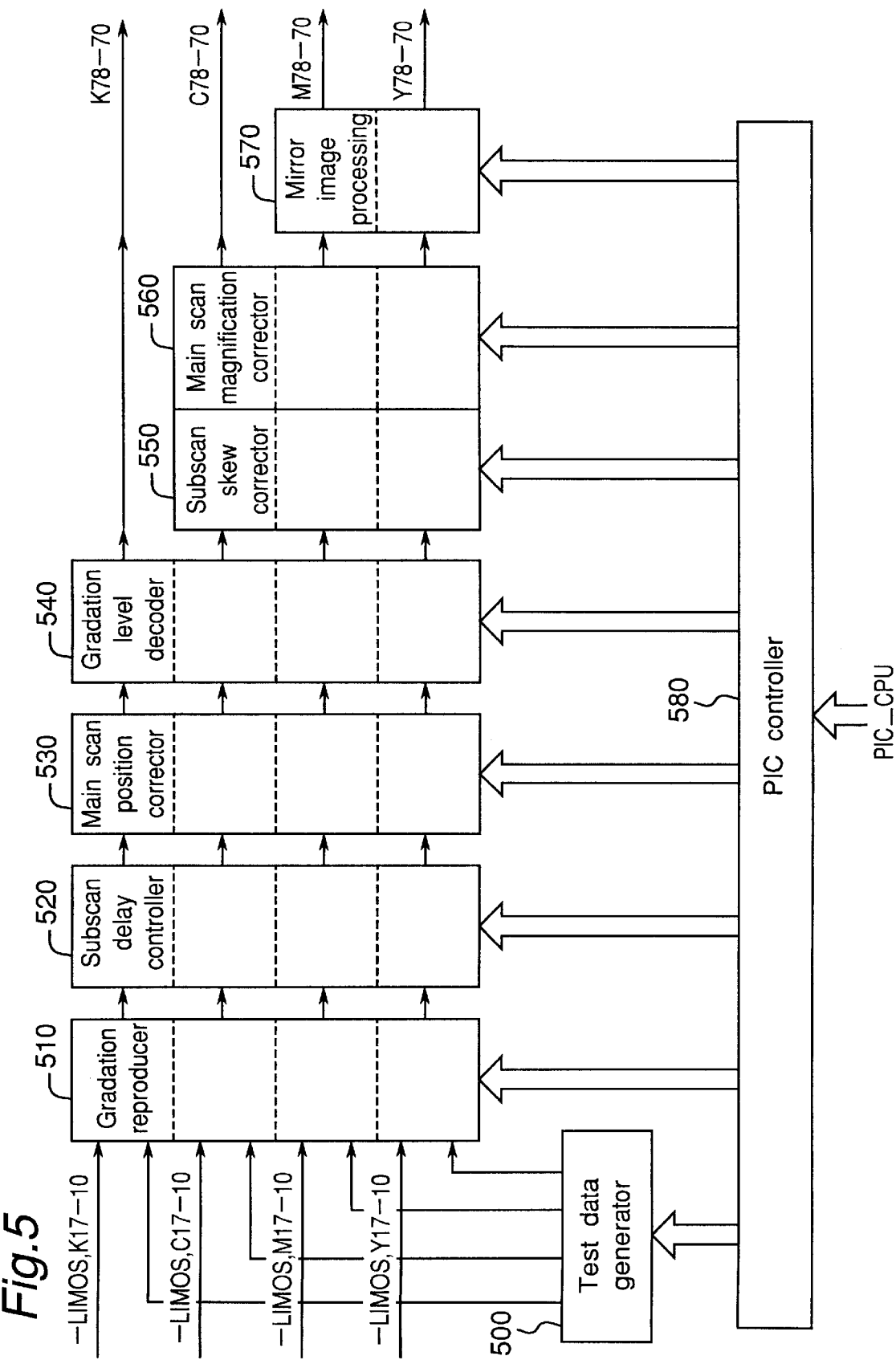
FIG. 5 is a block diagram of the print imaging controller.

FIG. 5 shows a print imaging controller 500 that performs the corrections. First, the C, M, Y and K image data transmitted from the image processor 205 are inputted to a gradation reproducer 510. Here, the 8-bit gradation level of the C, M, Y and K data is converted to 3-bit pseudo 256-gradation-level data by multi-level error diffusion of character separation type in accordance with the –LIMOS signal (gradation reproduction attribute signal).

Then, a subscan delay controller 520 corrects the drawing position of the K component by the K developing unit located at the most downstream position, on the basis of the paper, in order to correct the shift of the developing timing depending on the distance between the photoconductors (refer to FIG. 1). The positions of the other color components for the subscan are corrected relative to the K component. The position is corrected by controlling frame memory modules independently for cyan (C), for magenta (M), for yellow (Y) and for black (K). At the time of a double-sided copy, the frame memory modules need to previously store the image on the front side. For this reason, the frame memory modules have a capacity which stores four images each of data of A3 size.

Next, a main scan position corrector 530 controls line memories in order to correct the shift of the main scan start position for each of C, M, Y and K. As to write, the reference is set to the end of the platen glass which corresponds to the document reference position of the image reader, and it is independent of document size. On the other hand, in the reading control, the correction is performed with reference to the central position of the transfer belt which is related to the paper, and start of reading depends on paper size. The line memory has a capacity of two lines, and writing is controlled commonly on C, M, Y and K data. As to reading, one line is delayed relative to the writing, and in order to adjust the start position of main scan for printing, each of the colors is controlled. Next, a gradation level decoder 540 decodes the data to 256 gradation levels.

Images of test pattern data of C, M, Y and K for resist detection, which are generated by a test data generator 500, are simultaneously transferred onto the paper carrying belt 304. The amounts of color shift of the C, M and Y components from the K component are detected by a resist detecting sensor 314 which is located in a still more downstream site than the K developing unit located at the most downstream position. An image distortion corrector 550 and a main scan skew corrector 560 correct the main scan magnification distortion, the subscan bow distortion and the skew distortion of the C, M and Y components by means of the interpolation by a density distribution in accordance with the result of the color shift detection. The K image data from the drawing position controller 510 is only decoded to the 256-gradation-level data. Among the C, M, Y and K data corrected finally, the mirror image processing is performed on Y and M data at the upstream side in order to reverse the luster scan direction. Then, the C, M, Y and K data are transmitted to the print head controller (FIG. 11), and the image is reproduced.

Figure 6:
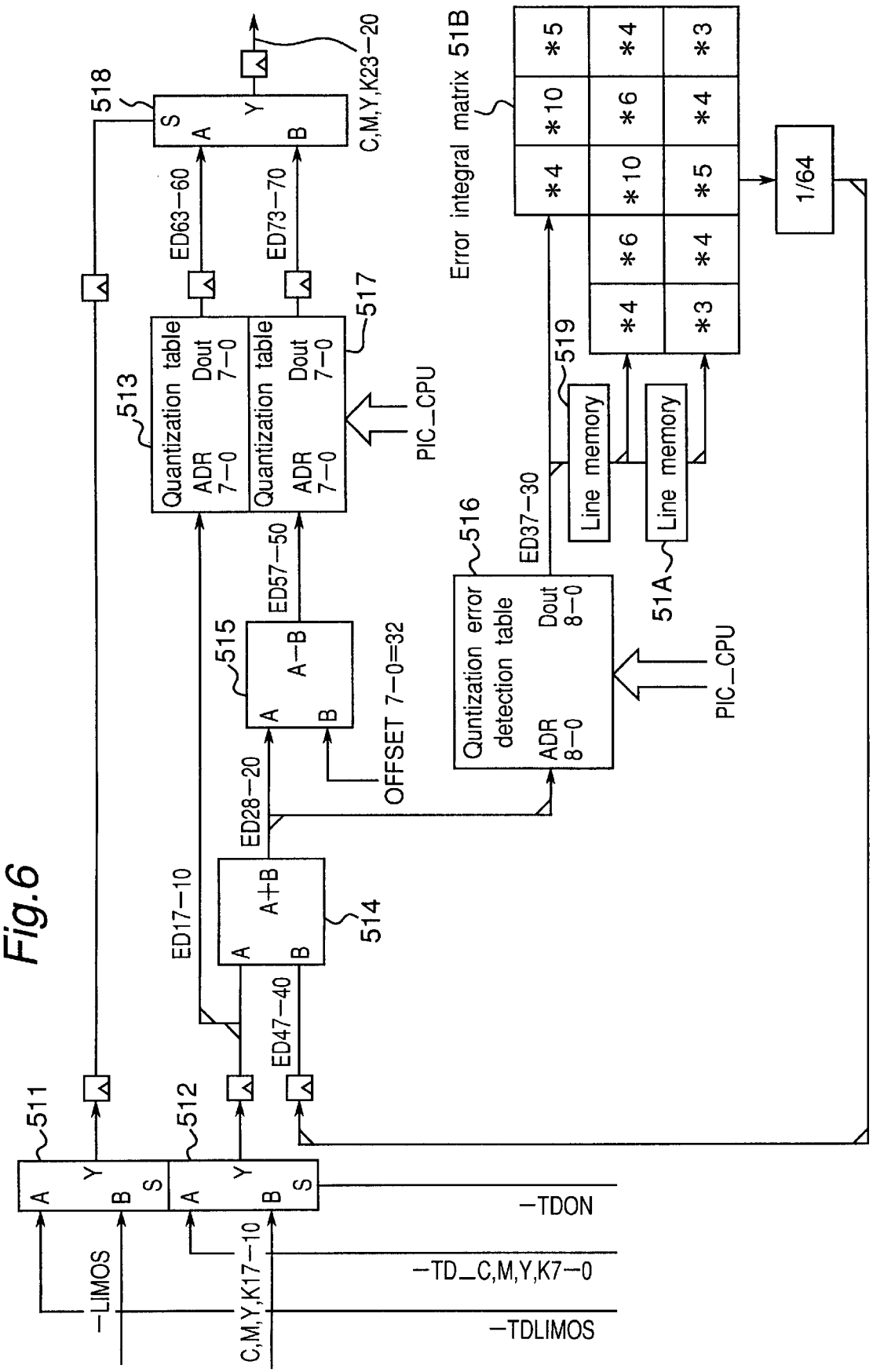
FIG. 6 is a block diagram of a gradation reproducer in the print imaging controller.

Next, the print imaging controller is explained further. FIG. 6 shows a block diagram of the gradation reproduction section 510 in the print imaging controller. The 8-bit data, which are obtained by converting the R, G and B data that are read by the image reader 200 into the C, M, Y and K data by means of the image processing, are simultaneously inputted to the gradation reproducer 500. The gradation reproducer 500 receives 8-bit image data of C, M, Y and K and the gradation reproduction attribute signal –LIMOS and converts them to the pseudo-256-gradation-levels by the multi-value error diffusion of character separation type. The gradation reproducer 510 outputs each 3-bit color data (gradation level data) and 1-bit gradation reproduction attribute signal for each color. Selectors 511 and 512 select test data TD_C, M, Y, K for the resist detection or image data C, M, Y, K from the image reader 200. The 8-bit data $ED_{17-10}$ selected by the selector 512 is converted by a first quantization table 513 (refer to FIG. 11) to 4-bit data $ED_{63-60}$ of 16 gradation levels obtained simply by dividing 0–255 gradation level range substantially equally into 16. That is, the following encoding is performed by the first quantization table 513.

| Input gradation level data | Encoded data |
|---|---|
| 0–3 | 0 |
| 4–11 | 1 |
| 12–23 | 2 |
| 24–39 | 3 |
| 40–55 | 4 |
| 56–71 | 5 |
| 72–87 | 6 |
| 88–103 | 7 |
| 104–119 | 8 |
| 120–135 | 9 |
| 136–151 | 10 |
| 152–167 | 11 |
| 168–183 | 12 |
| 184–207 | 13 |
| 208–239 | 14 |
| 240–255 | 15 |

On the other hand, as to continuous gradation portions, an error diffusion processor which will be explained below converts each of C, M, Y and K data to n-level quantized data (n>2) independently of each other, as will be explained later. An adder 514 adds $ED_{17-10}$ to feedback error data $ED_{17-10}$ which have been subjected to the error diffusion explained later and outputs a sum $ED_{28-20}$. That is, the adder 514 adds data subjected to integration with weights of errors to input data. Then, a subtractor 515 subtracts an offset quantity ($OFFSET_{7-0}$=32) from the sum $ED_{28-20}$. Thus, as described below, offset error data is cancelled so as not to result a negative error by an error detection table 906. A value $ED_{57-50}$ obtained by the subtraction is similarly converted to 4-bit gradation code data $ED_{73-70}$ by a second quantization table 517. The table 517 quantizes the data on which the offset data have been cancelled. That is, the quantization is performed by the table which receives data from the adder 514 as an address and outputs data at the address as a quantized data.

A selector 518 selects either the image data $ED_{73-70}$ after the error diffusion or the image data $ED_{63-60}$ obtained by simply encoding the input image data into 8-gradation-level data, in accordance with the gradation reproduction attribute signal –LIMOS. The attribute signal –LIMOS indicates a character edge if it is "L" level or indicates a continuous gradation level portion (non-edge) if it is "H" level. That is, a character edge is simply encoded into a 4-bit data by the first quantization table 513 as a result of simple quantization, while a non-character-edge is encoded into a 4-bit data by the second quantization table 517 due to error diffusion. Thus, the distortion or texture inherent to the error diffusion does not arise at a character edge, while smooth gradation level reproduction is realized at a continuous gradation level portion due to the multi-value error diffusion. The 4-bit C, M, Y and K gradation level data, C, M, Y and $K_{23-20}$ processed as explained above on the gradation level reproduction are transmitted to a following subscan delay controller.

Next, the error feedback route for the error diffusion is described. The sum $ED_{28-20}$ of the feedback error $ED_{47-40}$ and the input image data $ED_{17-10}$ is inputted to the error detection table 516 in order to determine error data to be added for a subsequent pixel. The error detection table 516 is a random access memory (RAM) table which receives data from the feedback adder 514 as an address and outputs data at the address as a quantization error signal. First, the error detection table 516 subtracts the offset error quantity (=32) from the input value. Then, it determines the gradation level errors in the gradation level ranges coinciding with threshold levels (=1, 8, 14, 32, 48, 64, 80, 96, 128, 144, 160, 176, 192, 224, 255) in the quantization table or 4-bit encoder 517.

Finally, the offset (=32) equivalent to the maximum negative error value is added so that the error can be integrated with weights at high speed in an error diffusion matrix 51B. Because the offset calculation is performed at the output of the error detection table 516 in order to cancel the error data by the maximum minus error (=−32), the error diffusion calculation does not need a calculation on a negative value (or only a simple adder circuit is needed). Consequently, the circuit operation is performed at high speed and the circuit scale can be small.

The content of the quantization error table 516 is as follows:

| Input gradation data (X) | Encoded data $D_{out}$ |
|---|---|
| X − 32 ≤ 3 | − (X − 32) +32 |
| 4 ≤ X − 32 ≤ 11 | 8 − (X − 32) +32 |
| 12 ≤ X − 32 ≤ 23 | 16 − (X − 32) +32 |
| 24 ≤ X − 32 ≤ 39 | 32 − (X − 32) +32 |
| 40 ≤ X − 32 ≤ 55 | 48 − (X − 32) +32 |
| 56 ≤ X − 32 ≤ 71 | 64 − (X − 32) +32 |
| 72 ≤ X − 32 ≤ 87 | 80 − (X − 32) +32 |
| 88 ≤ X − 32 ≤ 103 | 96 − (X − 32) 32 |
| 104 ≤ X − 32 ≤ 119 | 112 − (X − 32) 32 |
| 120 ≤ X − 32 ≤ 135 | 128 − (X − 32) 32 |
| 136 ≤ X − 32 ≤ 151 | 144 − (X − 32) 32 |
| 152 ≤ X − 32 ≤ 167 | 160 − (X − 32) 32 |
| 168 ≤ X − 32 ≤ 183 | 176 − (X − 32) 32 |
| 184 ≤ X − 32 ≤ 207 | 192 − (X − 32) 32 |
| 208 ≤ X − 32 ≤ 239 | 224 − (X − 32) 32 |
| 240 ≤ X − 32 ≤ 255 | 255 − (X − 32) 32 |

A series of the above-mentioned processing is performed by looking up the quantization error detection table 516, to output error data $ED_{37-30}$. The content in the table is downloaded by a central processing unit in the print imaging controller. The content can be changed in relation with the threshold level of the 4-bit encoding and the gradation level of a gradation level decoder described below.

The output error data $ED_{37-30}$ is integrated with predetermined weights (with values shown in FIG. 6) around an objective pixel by the error diffusion matrix 51B on three continuous lines by the use of line memories 519 and 51A which stores the errors of two lines. The error diffusion matrix 51B is used for the integration of the error with the weights which diffuses the detected quantization error to pixels adjacent to the object pixel.

The detection of quantization error and the high speed of the error integration in the error feedback system are needed because an error of a next pixel cannot be diffused if the calculation is slower than the transmission rate of the input image data C, M, Y, K. For the fast speed processing, the error diffusion section uses the table and performs the offset calculation to prevent processings for negative values (differential calculation) in the error integration.

Next, the subscan delay controller 520 is explained. It performs image delay to correct shift of drawing position after the gradation reproduction section 510 performs the multi-level error diffusion. After the above-mentioned multi-level error diffusion, the image delay is performed as explained below in order to correct displacement of drawing positions. It is advantageous that because the image delay is performed after the multi-level error diffusion, the memory capacity of delay memories can be decreased. It is also advantageous that finer correction becomes possible by performing bow correction after the data after the multi-level error diffusion are returned to data of the original number of gradation levels. On the contrary, if the image delay is performed after the conversion of the number of gradation levels in the multi-level diffusion or the like and the bow correction is performed on the converted data, the bow correction cannot be performed at high precision. If the multi-level error diffusion is performed after the bow correction, the screen angle of gradation reproduction may be shifted to cause More patterns of the image. However, such a problem does not happen by performing the bow correction after the multi-level error diffusion.

The subscan delay controller 520 has the following two functions.

(1) An image is stored in a memory for the time delays caused due to the positions of the photoconductors located along the subscan direction. The image is delayed and outputted.

(2) In the control of the main scan position, a start position of the drawing in the main scan direction is controlled, in order to correct a setting error of the print head of a position in the main scan direction, and the mirror image phenomenon of the C and M data due to the structure of the print head is corrected.

Figure 7:
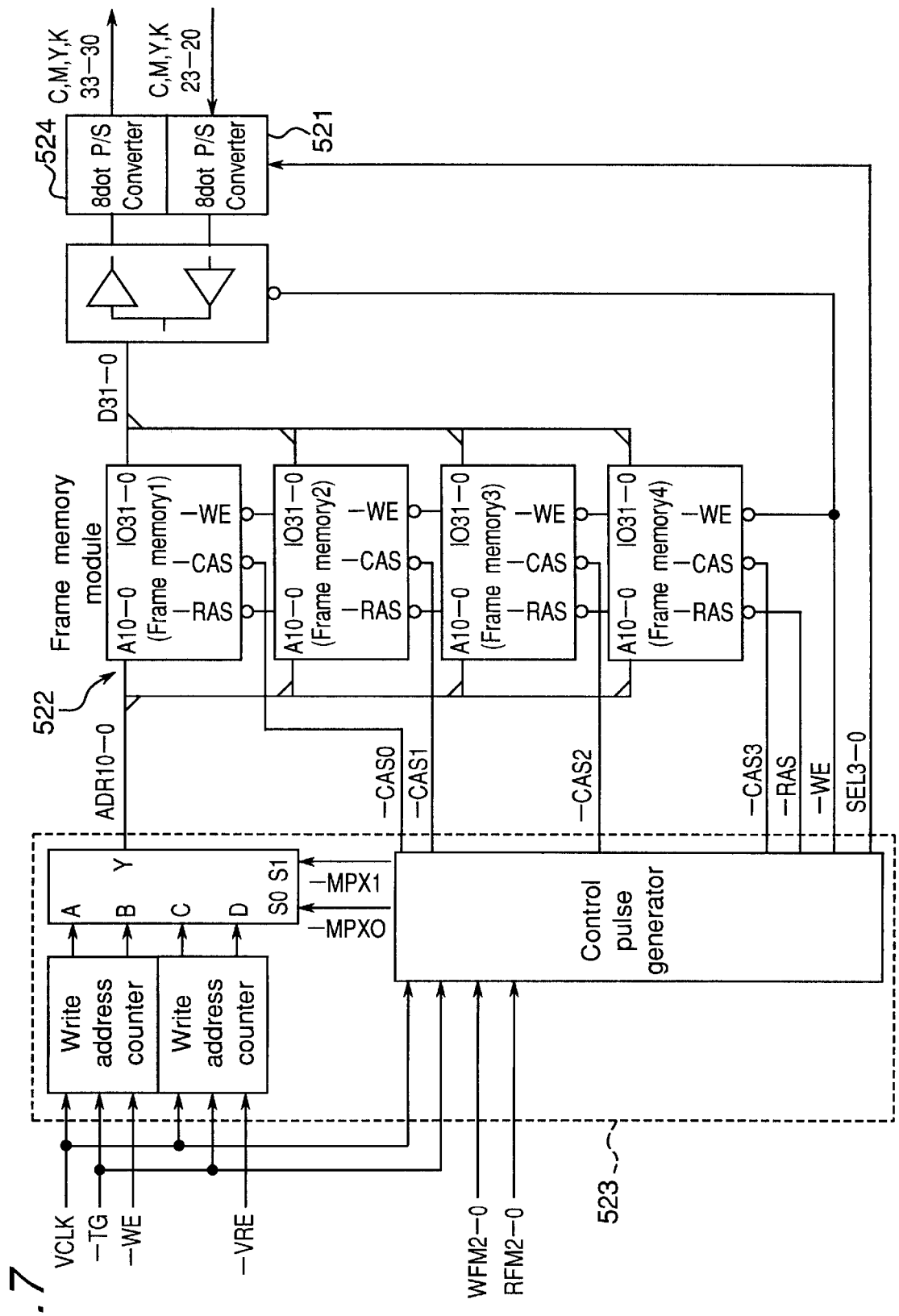
FIG. 7 is a block diagram of a subscan delay controller in the print imaging controller.

FIG. 7 shows the subscan delay controller 520, wherein the image stored in the frame memory is read according to a delay in correspondence to the distances between the photoconductors by controlling memory read in order to correct displacement of colors caused by shifts of drawing timings due to the arrangement of the photoconductors. It has similar circuits on the four colors C, M, Y and K, except the number of frame memories (delay quantity) in the frame memory modules 522. Signals C, M, Y, $K_{23-20}$ are converted to parallel signals by an 8-dot S/P serial-to-parallel (S/P) converter 521 to be sent to the frame memory modules 522, and they delay the C, M, Y and K data in the subscan direction. The frame memoroes are controlled by addresses $ADR_{9-0}$, RAS, $-CAS_{0,\,1,\,2}$, WE and $-OE$ outputted from a DRAM controller 523. The delay of the subscan is determined in accordance with a difference in the counts between a write address counter and a read address counter therein. The initial value of the write address counter is "0", while that of the read counter is VRE which is set by the central processing unit in the print imaging controller. Thus, the delay for each color is VRE lines. The read and write address counters generate the addresses in the main scan and subscan directions. The main scan address is counted by VCLK (image synchronization clock) and reset to the initial value by $-TG$ (main scan synchronization signal). The $-TG$ signal shows start of a line in main scan or an end of one line, and the subscan address is counted with the $-TG$ signal. The transmission of the image data is performed in synchronization of the clock VCLK. For the read address, the count is periodically set to VRE by the central processing unit in the print imaging controller, as described above. For the write address, the count is set to zero. The address to the DRAM modules 513 is selected from these counts by a following address selector in synchronization with the DRAM control. Next, an 8-dot parallel-to-serial (P/S) converter 524 converts the 32-bit parallel image data of eight dots to original 4-bit serial data C, M, Y, $K_{43-40}$ to be sent to the main scan position corrector 530.

Figure 8:
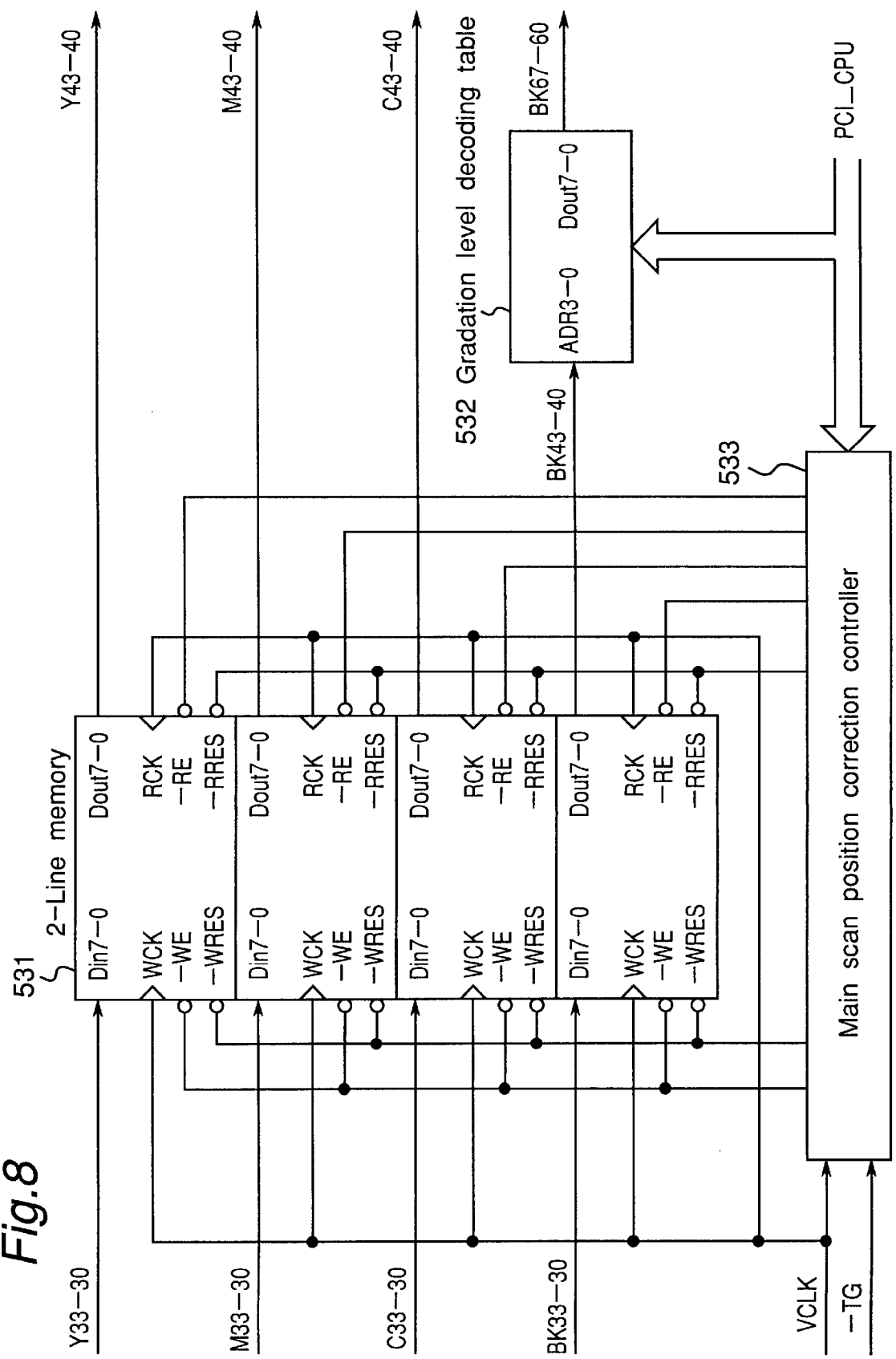
FIG. 8 is a block diagram of a main scan position corrector in the print imaging controller.

FIG. 8 shows the main scan position corrector 530. In order to correct color shifts between colors due to displacement of scan start positions in luster scan direction for each color, read is controlled for the correction by using 2-line memories 531 which store two lines of image. The position of the black image is determined with reference to the position of a paper to be supplied, while the other colors C, M and Y are controlled relative to black so as not to cause color shift. As explained above, in the main scan position corrector 530, as to read, the reference is controlled with respect to a document to be read in the image reader, while as to write, the reference is set to a central line of a transfer belt with respect to a paper to be supplied and it depends on the paper size. The K data are sent from the 2-line memory 531 to a gradation level decoding table 532. After the gradation level is converted, the data is sent to the print head. The main scan position corrector 530 is controlled by a controller 533.

The gradation decoding table 532 performs a processing reverse to the quantization table in the gradation reproducer 510. The content of the gradation decoding table 532 is shown below.

| Input code ($ADR_{3-0}$) | | Gradation level ($Dout_{7-0}$) |
|---|---|---|
| 0 | → | 0 |
| 1 | → | 8 |
| 2 | → | 16 |
| 3 | → | 32 |
| 4 | → | 48 |
| 5 | → | 64 |
| 6 | → | 80 |
| 7 | → | 96 |
| 8 | → | 112 |
| 9 | → | 128 |
| 10 | → | 144 |
| 11 | → | 160 |
| 12 | → | 176 |
| 13 | → | 192 |
| 14 | → | 224 |
| 15 | → | 255 |

The gradation decoding table 532 is a RAM table which can be downloaded by the print imaging controller, similarly to the quantization tables 513 and 517 and the quantization error detection table 516 in the gradation reproducer.

Next, the subscan skew corrector 550 (FIG. 9) and the main scan magnification corrector 560 (FIG. 10) are explained. In order to correct color shift due to deviation from parallelism between the photoconductor of each color and the laser beam scan and due to magnification of the laser beam scan system of each color, color shift within one dot is corrected, by selecting image data most indistinguishable on color shift of adjacent two lines and adjacent two dots, for each dot in the main scan direction, with a first-in first-out (FIFO) buffer plus an image selector and with a shift register plus an image selector. Thus, the color shift within one dot is corrected by using the selected adjacent data. For this processing, a density distributor 555 performs interpolation of the gradation data. Therefore, it is necessary that the decoding of the gradation data is performed before the density distribution. As to K data, the gradation level is converted just after main scan position correction to 156 gradation levels to be sent to the print head controller 320. Because C data have the same laser beam scan direction as the K data, they are sent after the main scan position correction to the print head controller 320. However, Y and M data of two colors in the upstream side have reverse san direction, so that they are sent to the print head controller 320 after the mirror image processing.

Figure 9:
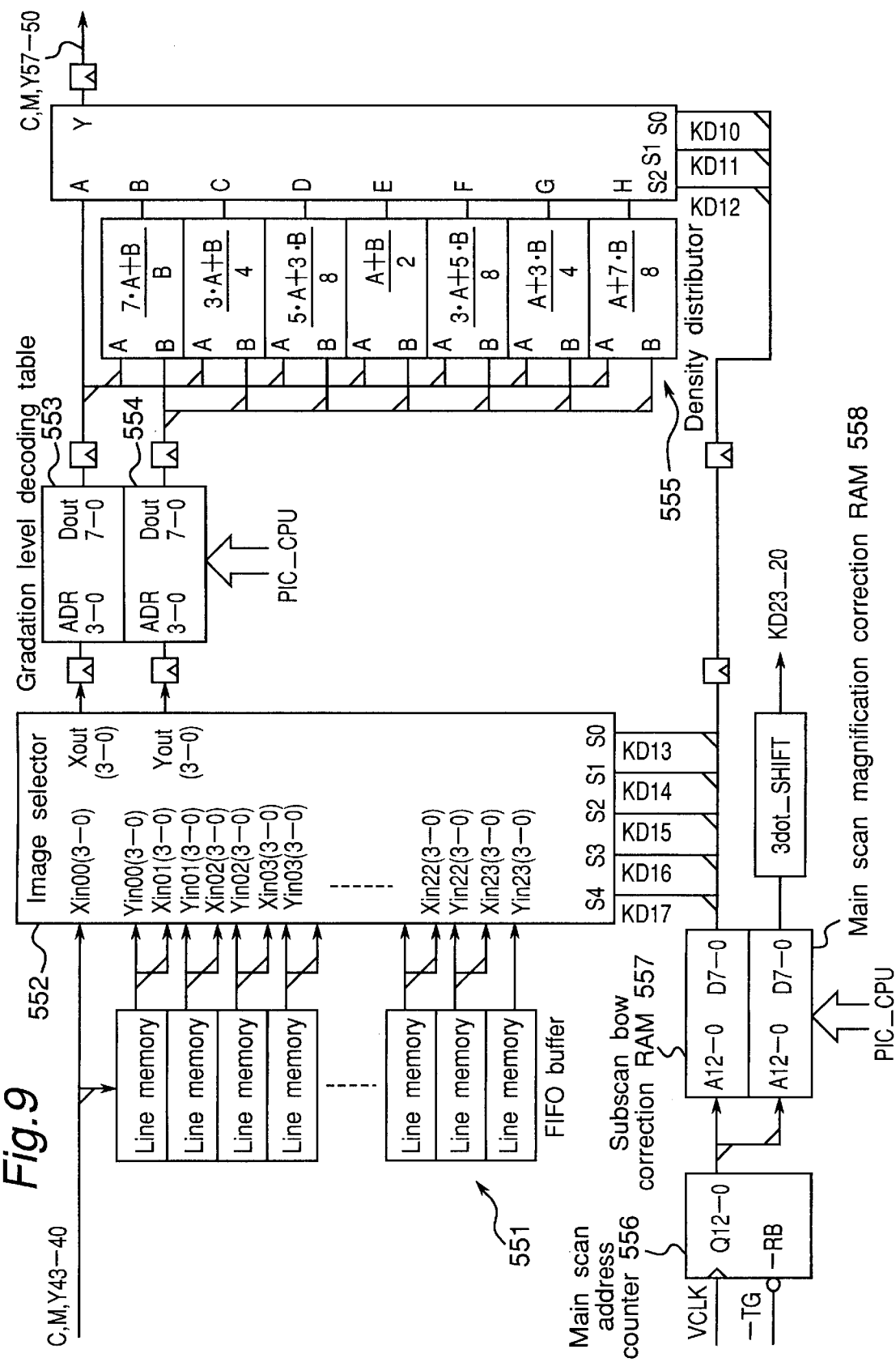
FIG. 9 is a block diagram of a subscan image skew corrector.

FIG. 9 shows the subscan skew corrector 550. The data C, M, $Y_{43-40}$ of the colors corrected on the drawing position in the main scan and in the subscan are transmitted to a first-in first-out (FIFO) buffer memory 551 having 24 line memories capable of storing the line data corresponding to the maximum distortion width (or 24 lines). The FIFO buffer memory 551 stores 24 lines of the image data C, M, Y and $K_{53-50}$ continuously transmitted for each line. The line memories in the FIFO buffer memory 541 are connected dependently in series, so that the data is sequentially delayed line by line. A read/write clock of the FIFO buffer memory 551 is VCLK. On the other hand, a main scan address counter 556 counts the address with VCLK, and the address is reset with −TG signal. The output signal is sent to a subscan bow correction RAM 557 and a main scan magnification correction RAM 558.

The delay data of each line is the FIFO buffer memory 551 is inputted in parallel to an image selector 552. In order that the following density distributor 554 is easily operated, data of two adjacent lines are outputted in parallel among the data of 24 lines*4 bits supplied from the FIFO buffer memory 551. It is determined according to an interpolation data $KD_{17-13}$ sent from the subscan bow correction RAM 557 to select control terminals $S_{4-0}$. That is, when n-th line delay data are selected at one output $Xout_{3-0}$, the other output $Yout_{3-0}$ outputs (n+1)-th line delay data. A signal to be outputted to $Xout_{3-0}$ is selected from inputs $Xin00_{3-0}$ to $Xin23_{3-0}$ according to the 5-bit signal $KD_{17-13}$ for the subscan interpolation data.

A gradation decoding table 553 converts or decodes bits 3 to 0 representing the gradation code in the signals of two lines to gradation level in correspondence to the threshold level in the 4-bit encoder in the gradation reproducer. The content of the gradation level decoding table 553 is the same as the above-mentioned table 532. Then, image data of adjacent two lines are decoded to data of the original gradation number before the pseudo-gradation reproduction.

A density distributor 554 performs interpolation of density distribution type for each 1/8 dot by using the data of two adjacent lines. That is, assuming that A and B are n-th and (n+1)-th line gradation level data, the interpolation is as follows.

| | |
|---|---|
| $KD_{12 \to 10} = 0 \to$ | $Y = A$ |
| $KD_{12-10} = 1 \to$ | $Y = (7A + B) / 8$ |
| $KD_{12-10} = 2 \to$ | $Y = (3A + B) / 4$ |
| $KD_{12-10} = 3 \to$ | $Y = (5A + 3B) / 8$ |
| $KD_{12-10} = 4 \to$ | $Y = (A + B) / 2$ |
| $KD_{12-10} = 5 \to$ | $Y = (3A + 5B) / 8$ |
| $KD_{12-10} = 6 \to$ | $Y = (A + 3B) / 4$ |
| $KD_{12-10} = 7 \to$ | $Y = (A + 7B) / 8$ |

Therefore, a mixture ratio of inputs A:B for output Y is changed in eight ways according to the subscan interpolation data KD. The interpolation data KD determines which calculation data is adopted. Assuming that a correction quantity due to the distortion is q lines, the interpolation data $KD_{17-10}$ is 8*q. Thus, the distortion corrector 550 can correct the distortion with high accuracy at every 1/8 dot within the width of 24 lines. That is, the gradation reproducer 510 reduces a memory capacity of the delay memory needed for the subscan drawing position control to a half by encoding the data into the 4-bit data, while maintaining the 8-bit image quality (this is similar for the main scan). In the interpolator which does not need a large memory capacity, the gradation level is decoded to the 8-bit data so that the interpolation can be performed with high accuracy, for density distribution. After the density distribution for the subscan, the data is outputted as C, M and $Y_{57-50}$ to the image distortion corrector 560 for the main scan.

Figure 10:
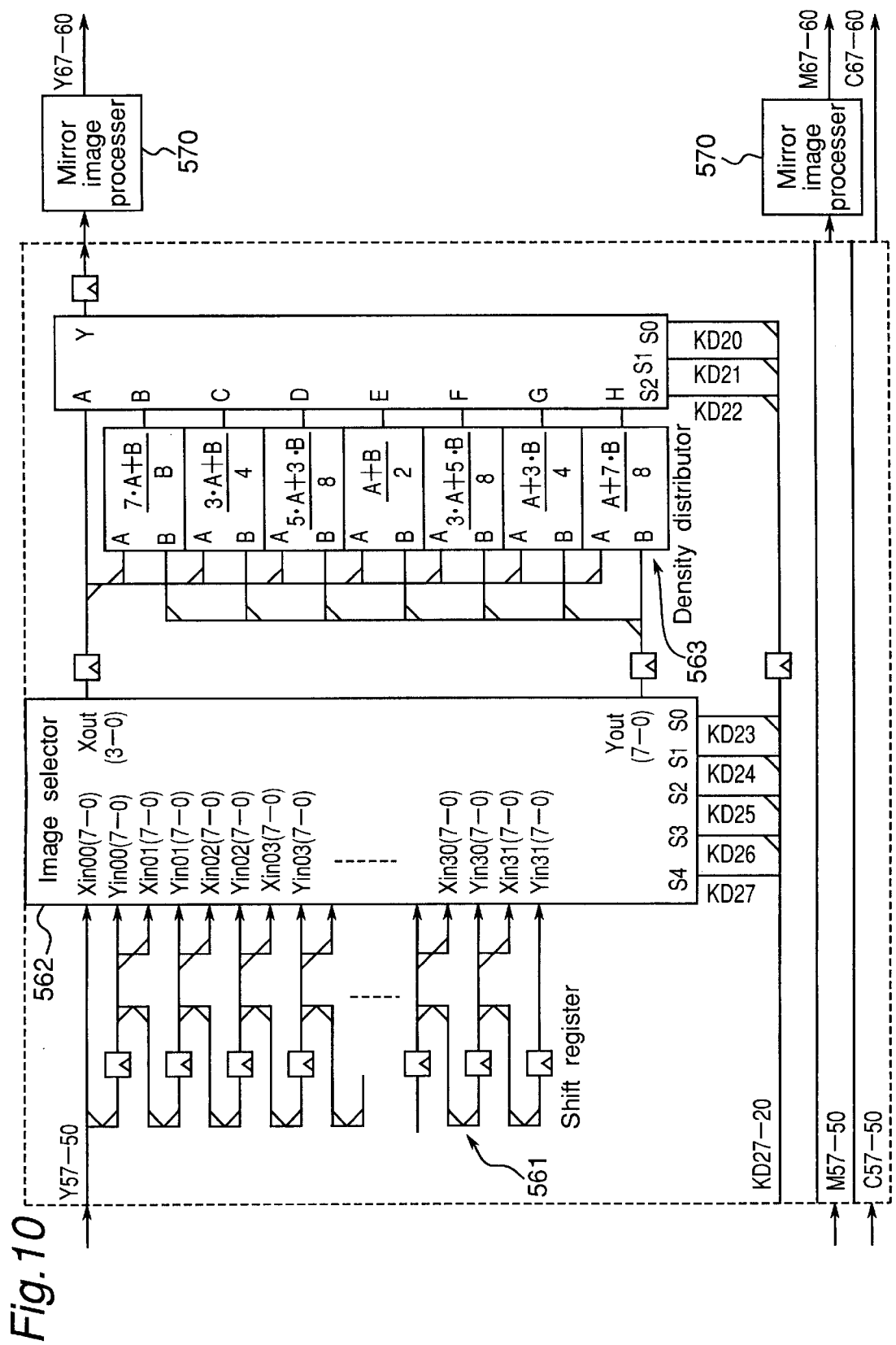
FIG. 10 is a block diagram of a main scan magnification corrector.

As shown in FIG. 10, the main scan magnification corrector 560 performs interpolation similarly to the subscan skew correction. Differently from the subscan, a shift register 561 using flip-flop circuits is used in order to generate continuous delay data along the main scan direction instead of the FIFO buffer memory. In this case, the width of the maximum distortion correction is set so that 9-bit data can be delayed by 32 dots. An image selector 562 selects the data of two adjacent dots among the data. Since the values are already decoded to gradation level, a decoder is not needed. A density distributor 563 performs density distribution between the two adjacent dots. The density distribution and the selection of the image of two adjacent lines are performed in accordance with the main scan interpolation data $KD_{27-20}$.

The C, M, Y and K image (C, M, Y and $K_{78-70}$) which have been corrected on the image distortion in the main scan and subscan directions are sent through an interface to the print head controller 320 (FIG. 11), and an image is formed by exposure on the photoconductors for the colors with optical modulation.

As explained above, the gradation level decoder 540 is arranged after the subscan delay controller 520 and the main scan position corrector 530, the bit width of data in the frame memories in the subscan delay controller 520 and the 2-line memories in the main scan position correctors 530 are as small as four bits. Therefore, the memory capacity and the cost of the memory can be decreased by a factor of 1/2. Further, as to the C, M and Y components, because the FIFO buffer memories needed in the subscan skew corrector 550 is arranged after the gradation level decoder 540, the bit width for data in the FIFO memories is also as small as four bits, and the memory capacity can be decreased by a factor of 1/2.

In this embodiment, the error diffusion is performed by dividing the gradation range between 0 and 255 to 16 equal widths. However, in an electrophotographic printer engine, an image quality is affected largely by the granularity of the toners and the gradation property at the highlight side.

Therefore, the quantization levels are dispersed densely at the highlight side and coarsely at the high density side. Thus, the pseudo-gradation phenomenon due to texture inherent to error diffusion becomes unnoticeable.

However, the range where the pseudo-gradation range is observed is changed according to the electrophotographic processes in the printer affected by environmental factors. Therefore, there will be situations where it is necessary to emphasize the gradation at the highlight side or at the high density side. If it is necessary to emphasize the gradation at the highlight side, the threshold levels in the encoder are set more densely towards the side around 0, while if it is necessary to emphasize the gradation at the high density side, the threshold levels in the coder are set more densely towards the side around 255.

If it is sufficient that the number of gradation levels is 8, instead of 16, the tables are changed in correspondence to the number (refer to examples shown later), and this decreases the memory capacity. The number of gradation levels can be changed easily by rewriting the conversion data in the quantization table, the quantization error detection table and the gradation decoding table in the gradation reproducer 510 by the central processing unit in the print imaging controller.

In this embodiment, the quantization error detection table, the quantization table and the gradation level decoding table are TAM tables. Therefore, the central processing unit in the print imaging controller can easily download the contents in the tables according to the predetermined gradation characteristics. Thus, the gradation reproduction can be performed in a very flexible way. Further, by adopting this technique, a hardware circuit for the multi-level error diffusion can be realized by using simple table processing, and a series of processing can be calculated at high speed.

Next, examples of the quantization table, the quantization error table and the gradation decoding table are described which have the number of quantization at eight bits.

The content of the quantization table is as follows:

| Input gradation level data ($ADR_{7-0}$) | Encoded data ($Dout_{3-0}$) |
|---|---|
| 0–7 | 0 |
| 8–23 | 1 |
| 24–47 | 2 |
| 48–79 | 3 |
| 80–111 | 4 |
| 112–159 | 5 |
| 160–223 | 6 |
| 224–255 | 7 |

The content of the quantization error detection table 906 is as follows:

| Input gradation data (X) ($ADR_{8-0}$) | Encoded data $D_{out}$ ($Dout_{7-0}$) |
|---|---|
| $X - 32 \leq 7$ | $-(X - 32) + 32$ |
| $8 \leq X - 32 \leq 23$ | $16 - (X - 32) + 32$ |
| $24 \leq X - 32 \leq 47$ | $32 - (X - 32) + 32$ |
| $48 \leq X - 32 \leq 79$ | $64 - (X - 32) + 32$ |
| $80 \leq X - 32 \leq 111$ | $96 - (X - 32) + 32$ |
| $112 \leq X - 32 \leq 159$ | $128 - (X - 32) + 32$ |
| $160 \leq X - 32 \leq 223$ | $192 - (X - 32) + 32$ |
| $224 \leq X - 32$ | $255 - (X - 32) + 32$ |

Further, the content of the gradation decoding table is as follows:

| Input code ($ADR_{3-0}$) | Gradation level ($Dout_{7-0}$) |
|---|---|
| 0 → | 0 |
| 1 → | 16 |
| 2 → | 32 |
| 3 → | 64 |
| 4 → | 96 |
| 5 → | 128 |
| 6 → | 192 |
| 7 → | 255 |

Next, examples of the quantization table, the quantization error table and the gradation decoding table are described which emphasize the gradation at the highlight side while keeping the number of quantization at four bits (16 values).

The content of the quantization table is as follows:

| Input gradation level data ($ADR_{7-0}$) | Encoded data ($Dout_{3-0}$) |
|---|---|
| 0–1 | 0 |
| 2–5 | 1 |
| 6–11 | 2 |
| 12–23 | 3 |
| 24–39 | 4 |
| 40–55 | 5 |
| 56–71 | 6 |
| 72–87 | 7 |
| 88–103 | 8 |
| 104–119 | 9 |
| 120–135 | 10 |
| 136–151 | 11 |
| 152–175 | 12 |
| 176–207 | 13 |
| 208–239 | 14 |
| 240–255 | 15 |

The content of the quantization error detection table 906 is as follows:

| Input gradation data (X = $ADR_{8-0}$) | Encoded data $Dout_{7-0}$ |
|---|---|
| $X - 32 \leq 1$ | $-(X - 32) + 32$ |
| $2 \leq X - 32 \leq 5$ | $4 - (X - 32) + 32$ |
| $4 \leq X - 32 \leq 11$ | $8 - (X - 32) + 32$ |
| $12 \leq X - 32 \leq 23$ | $16 - (X - 32) + 32$ |
| $24 \leq X - 32 \leq 39$ | $32 - (X - 32) + 32$ |
| $40 \leq X - 32 \leq 55$ | $48 - (X - 32) + 32$ |
| $56 \leq X - 32 \leq 71$ | $64 - (X - 32) + 32$ |
| $72 \leq X - 32 \leq 87$ | $80 - (X - 32) + 32$ |
| $88 \leq X - 32 \leq 103$ | $96 - (X - 32) + 32$ |
| $104 \leq X - 32 \leq 119$ | $112 - (X - 32) + 32$ |
| $120 \leq X - 32 \leq 135$ | $128 - (X - 32) + 32$ |
| $136 \leq X - 32 \leq 151$ | $144 - (X - 32) + 32$ |
| $152 \leq X - 32 \leq 167$ | $160 - (X - 32) + 32$ |
| $172 \leq X - 32 \leq 207$ | $192 - (X - 32) + 32$ |
| $208 \leq X - 32 \leq 239$ | $224 - (X - 32) + 32$ |
| $240 \leq X - 32$ | $255 - (X - 32) + 32$ |

Further, the content of the gradation decoding table is as follows:

| Input code (ADR$_{3-0}$) | | Gradation level (Dout$_{7-0}$) |
|---|---|---|
| 0 | → | 0 |
| 1 | → | 4 |
| 2 | → | 8 |
| 3 | → | 16 |
| 4 | → | 32 |
| 5 | → | 42 |
| 6 | → | 64 |
| 7 | → | 80 |
| 8 | → | 96 |
| 9 | → | 112 |
| 10 | → | 128 |
| 11 | → | 144 |
| 12 | → | 160 |
| 13 | → | 192 |
| 14 | → | 224 |
| 15 | → | 255 |

Figure 11:
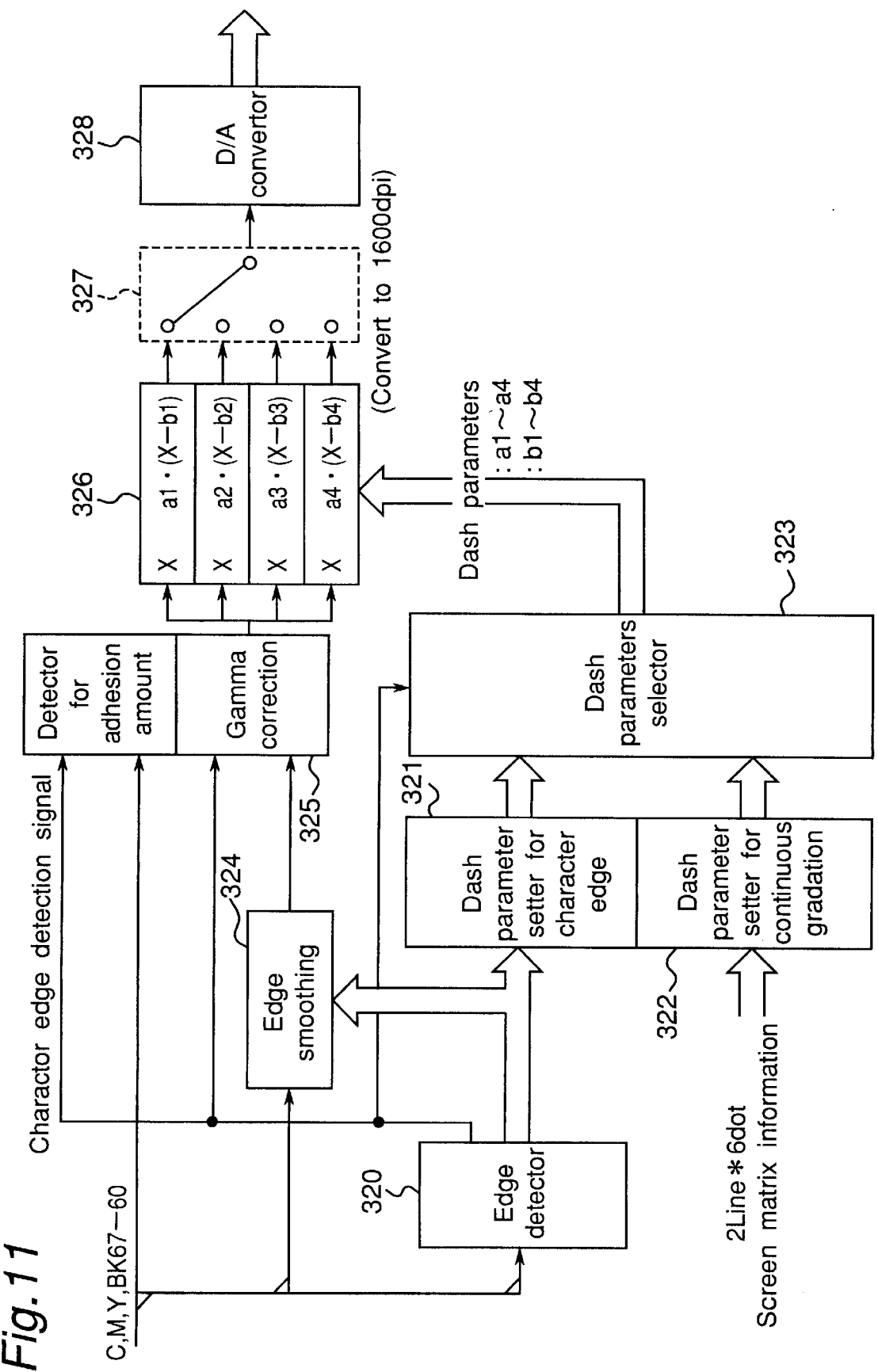
FIG. 11 is a block diagram of a print head controller.

FIG. 11 shows the print head controller 320 wherein the image data C, M, Y and K$_{67-70}$ are subjected to gamma correction for the gradation distortion due to gamma characteristics in the electrophotographic processes, and the gradation level is converted to an analog signal to be sent to a laser diode driver. In the print head controller 320, an edge detector 320 detects edges in the image before the gamma correction, and the data after the detection are sent to a Dash parameter section 321 for character edge. A character edge detection signal is sent to a gamma correction section 325 and to the Dash parameter selector 323 which provides multiplication coefficients a1 to s4 and subtraction coefficients b1 to b4. For a character edge, the Dash parameter section 321 sets parameters for intensity modulation of laser beam in a period of one dot, in order to give priority to resolution. For a continuous gradation portion, another Dash parameter section 322 for continuous gradation sets parameters for intensity modulation of laser beam in a period of two dots for gradation reproduction. In this case, the modulation at the two-dots period sets a screen angle different in the colors in order to improve the granularity. The Dash parameter selector 323 selects the Dash parameters (multiplying and difference factors) to be outputted to a calculator 326.

Further, an edge smoothing section 324 performs smoothing on the image data. The image data subjected to the smoothing are corrected by the gamma correction section 325. The corrected data are further corrected by the calculator 326 by using the above-mentioned four kinds of Dash parameters. A data selected by a selector 327 is converted by a digital-to-analog converter 328 to an analog signal, which is output to the laser diode driver.

The above-mentioned processing has following advantages. In the multi-level error diffusion in an image processor, because the quantizer and the quantization error detector use tables, high speed circuit operation is realized in the error detection and in the error integration, and the circuit structure is simplified. Further, by using RAM tables for the above-mentioned tables, the characteristics of the output data on the quantization can be changed easily.

In the quantization error detection, a negative value is prevented by using the offset data addition, so that high speed circuit operation is realized in the error detection and in the error integration, and the circuit structure is simplified further.

Further, by combining it with simple quantization, when the input image data are at boundaries of characters, the awkward reproduction of character image can be vanished, and image quality of the characters is improved.

By setting the threshold levels for quantization densely at the highlight side, the image texture is suppressed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor which converts an m-bit image signal representing image density level of each pixel to an n-bit image signal where m and n are natural numbers, comprising:

a quantizer which quantizes a first m-bit image signal representing image density level of an object pixel to an n-bit image signal;

an error detector which detects an error generated in the quantization of the first m-bit image signal by said quantizer; and an adder which adds the error detected by said error detector to a next m-bit image signal;

wherein said error detector comprises a table which receives the output signal of said adder as an address and outputs data stored at the address as the error to said adder.

2. The image processor according to claim 1, wherein said quantizer comprises a random access memory which stores a look-up table.

3. The image processor according to claim 1, further comprising an error integration matrix with predetermined weights which receives the error detected by said error detector and integrates the error with the predetermined weights to diffuse the error to pixels around the object pixel.

4. The image processor according to claim 1, wherein said quantizer has threshold levels for quantization a higher density at highlight side of the m-bit image signal.

5. An image processor which converts an m-bit image signal representing image density level of each pixel to an n-bit image signal where m and n are natural numbers, comprising:

a first converter which quantizes the m-bit image signal representing image density level of pixels located at a character boundary to the n-bit image signal;

a second converter which quantizes the m-bit image signal of pixels other than the pixels located at a character boundary to the n-bit image signal; and a selector which synthesizes outputs of said first and second converters;

wherein said second converter comprising:

a quantizer which quantizes a first m-bit image signal representing image density level of an object pixel to an n-bit image signal;

an error detector which detects an error generated in the quantization of the first m-bit image signal by said quantizer; and an adder which adds the error detected by said error detector to a next m-bit image signal;

wherein said error detector comprises a table which receives the output signal of said adder as an address and outputs data stored at the address as the error to said adder.

6. The image processor according to claim 5, wherein said quantizer comprising a random access memory which stores a look-up table.

7. The image processor according to claim 5, said second converter further comprising an error integration matrix with predetermined weights which receives the error detected by said error detector and integrates the error with the predetermined weights to diffuse the error to pixels around the object pixel.

8. The image processor according to claim 5, wherein said quantizer has threshold levels for quantization a higher density at highlight side of the m-bit image signal.

9. A method which converts an m-bit image signal representing image density level of each pixel to an n-bit image signal where m and n are natural numbers, the method comprising the steps of:

quantizing a first m-bit image signal representing image density level of an object pixel to an n-bit image signal;

detecting an error generated in the quantization of the first m-bit image signal; and adding the error detected to a next m-bit image signal;

wherein in said detecting step, the error is detected by using a table which receives the sum of the addition as an address and outputs data stored at the address as the error.

10. The method according to claim 9, wherein in said the quantizing step, the m-bit image signal is converted to the n-bit image signal by using a random access memory which stores a look-up table.

11. The method according to claim 9, further comprising the step of performing error integration by using an error integration matrix with predetermined weights which receives the error detected by said error detector and integrates the error with the predetermined weights to diffuse the error to pixels around the object pixel.

12. The method according to claim 9, wherein in said quantizing step, threshold levels for quantization have a higher density at highlight side of the m-bit image signal.

* * * * *